United States Patent [19]

Lenhart et al.

[11] Patent Number: 5,171,416
[45] Date of Patent: Dec. 15, 1992

[54] METHOD FOR MAKING A BATTERY CELL ELECTRODE

[75] Inventors: Stephen J. Lenhart; Catherine L. English, both of Mountain View, Calif.

[73] Assignee: Space Systems/Loral, Inc., Palo Alto, Calif.

[21] Appl. No.: 595,327

[22] Filed: Oct. 10, 1990

[51] Int. Cl.$^5$ .................. H01M 10/00; H01M 10/04; C25F 3/00
[52] U.S. Cl. ........................................ 205/57; 205/60; 204/129.43; 204/130; 204/DIG. 9
[58] Field of Search ......... 204/129.1, 129.43, DIG. 9, 204/130; 205/57, 60

[56] References Cited

U.S. PATENT DOCUMENTS

| | | | |
|---|---|---|---|
| 3,335,033 | 8/1967 | Kober | 205/60 |
| 3,507,699 | 4/1970 | Pell et al. | 205/60 |
| 3,523,828 | 8/1970 | Schneider | 205/60 |
| 3,715,238 | 2/1973 | Mayell | 204/130 X |
| 4,132,606 | 1/1979 | Crespy et al. | 205/57 X |
| 4,292,143 | 9/1981 | Seiger et al. | 205/60 |
| 4,482,434 | 11/1984 | Pliefke | 204/129.4 X |
| 4,540,476 | 10/1985 | Dyer | 204/DIG. 9 X |
| 4,554,056 | 11/1985 | Whitford | 205/60 |
| 4,863,484 | 9/1989 | Beauchamp et al. | 205/57 X |
| 4,897,168 | 1/1990 | Boergerding et al. | 204/129.43 |
| 5,041,198 | 8/1991 | Hausman | 204/129.4 X |

FOREIGN PATENT DOCUMENTS 61-113797 5/1986 Japan .............................. 204/129.43

OTHER PUBLICATIONS

Arivia, et al., "The Electrochemical Facetting of Metal Surfaces: Preferred Crystallographic Orientation and Roughening Effects in Electrocatalysis," 20 Journal of Applied Electrochemistry 347-356 (May 1990).
Arivia, et al, "Review Article Electrochemical Facetting of Metal Electrodes," 31 Electrochimica Acta 1359-1368 (Nov. 1986).
Perdriel, et al, "Different Processes Contributing to the Developement of Preferred Oriented Platinum Surfaces by Fast Periodic Potential Perturbation Techniques," 205 Journal of Electroanalytical and Interfacial Electrochemistry 279-290 (Jun. 25, 1986).
Triaca, et al, "A Study of the Optimal Conditions for the Development of Preferred Oriented Platinum Surfaces by Means of Fast Square Wave Potential Perturbations," 134 Journal of Electrochemical Society 1165-1172 (May 1987).
Albano, et al., "A Mechanistic Model For the Electrochemical Facetting of Metals with Development of Preferred Crystallographic Orientations," 33 Electrochimica Acta 271-277 (Feb. 1988).
Cervino, et al., "A Novel Effect, Changes in the Electrochemical Response of Polycrystalline Platinum Promoted by Very Fast Potential Perturbations," 132 Journal of Electrochemical Society 266-67 (1985).

*Primary Examiner*—Donald R. Valentine
*Attorney, Agent, or Firm*—Greg T. Sueoka; Edward J. Radlo

[57] ABSTRACT

A method for making a battery electrode includes roughening the surface of a substrate (10) that constitutes a precursor to the electrode, using an electrolytic solution (12) with electrical potential perturbations applied thereto. The substrate (10) of porous sintered nickel powder is first formed. The electrolytic solution (12) prefereably contains the pure metal that forms the electrode. Then all gases in and around the substrate (10) are preferably removed. Next, the substrate (10) is placed in the solution (12) for a predetermined amount of time. Potential perturbations are then applied to the substrate (10) and the solution (12). The potential perturbations vary between the voltages necessary for electrodissolution and electrodepositon of the substrate (10), and thus, cause the surface of the substrate (10) to be roughened as portions of the substrate (10) are dissolved into the solution (12) and then redeposited onto the substrate's (10) surface. Once roughened, the plaque (14) is removed from the solution (12) and any remaining solution is rinsed off the roughened plaque (14).

32 Claims, 2 Drawing Sheets

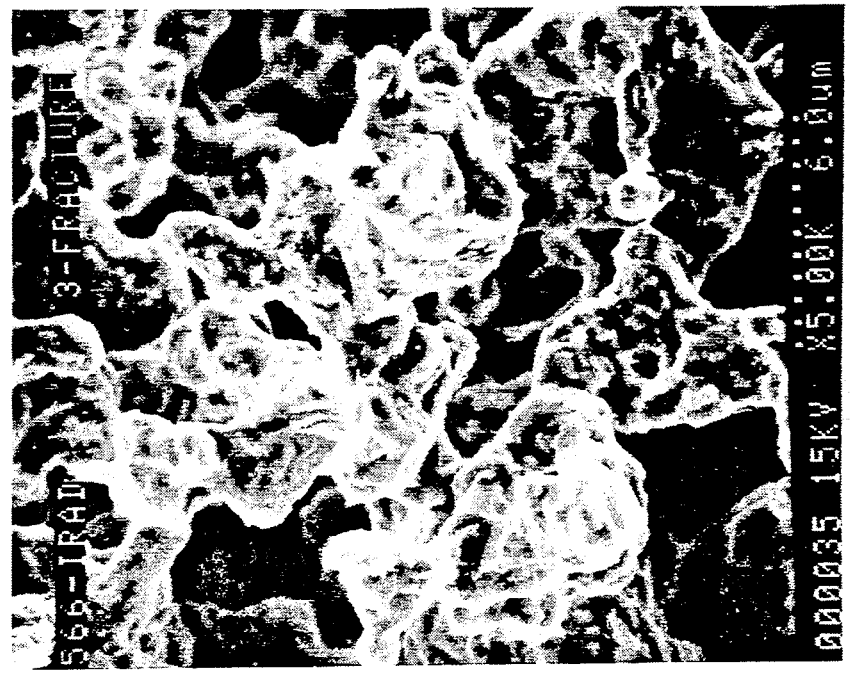
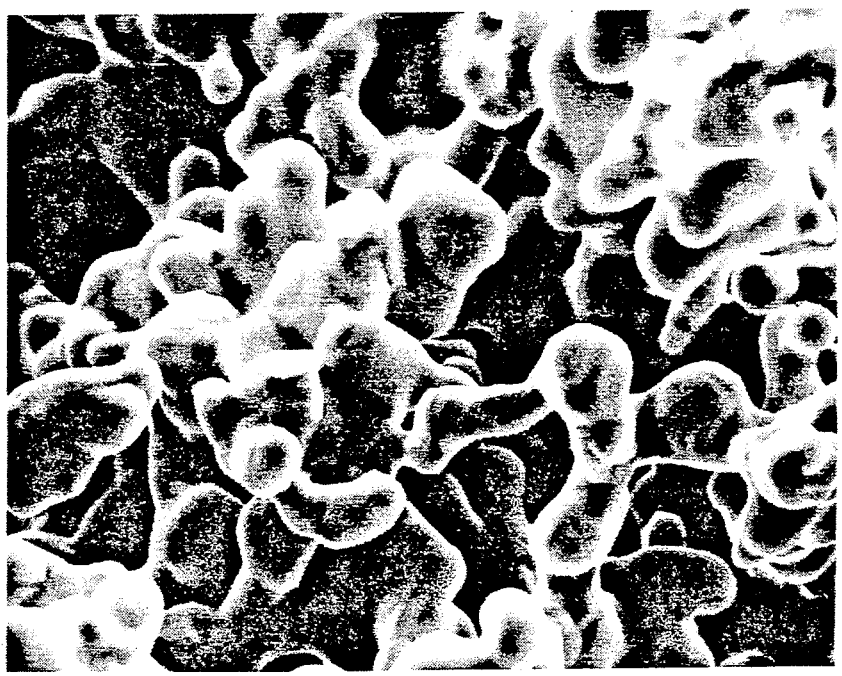
FIG.1A

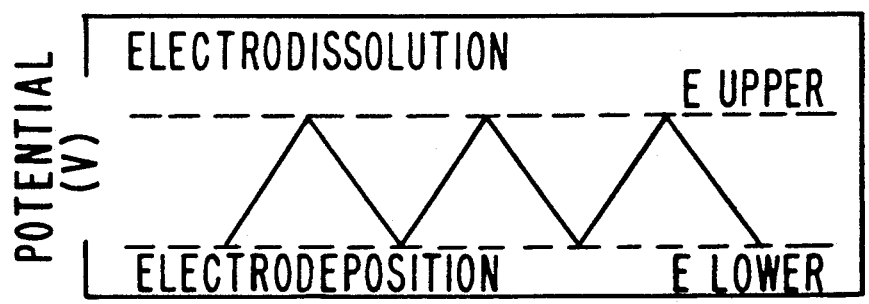
FIG_2
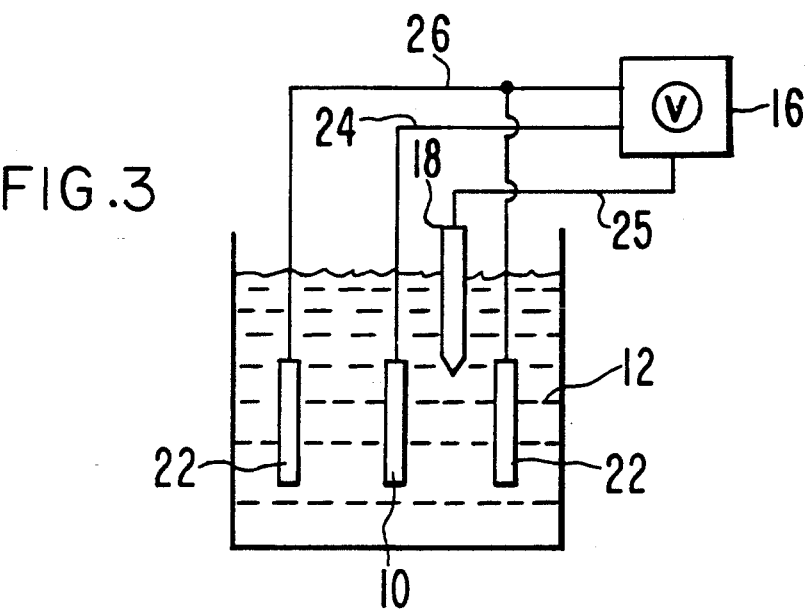
FIG.3
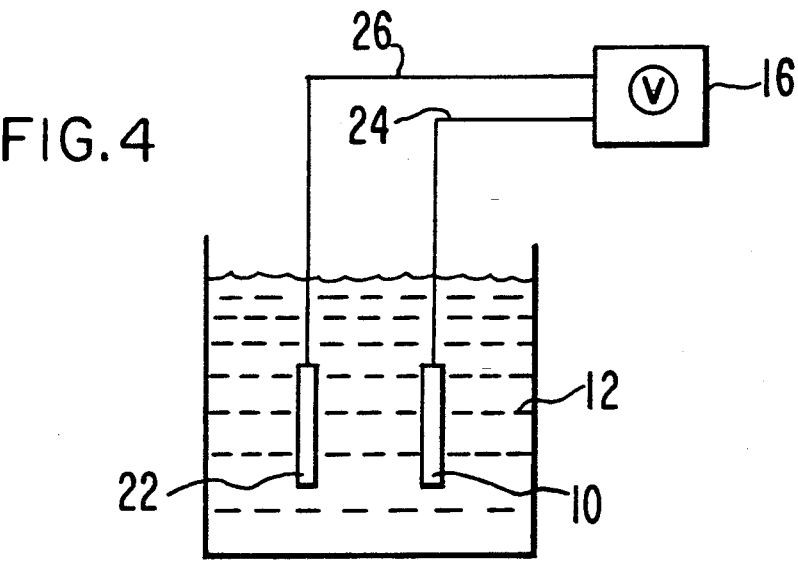
FIG.4

METHOD FOR MAKING A BATTERY CELL ELECTRODE

BACKGROUND OF THE INVENTION

1. Field of the Invention

The present invention relates to methods for manufacturing battery cell electrodes. In particular, the invention relates to an electrochemical method for roughening the surface of an electrode substrate to provide a greater amount of contact area for active material.

2. Description of Related Art

A continuing problem with batteries is their large size and weight. Many systems demand batteries with a smaller mass and increased performance. In particular, the mass, size and performance of batteries is critical for applications in space. The mass and size are significant because of the tremendous launch and payload costs for spacecraft. Performance is important because batteries in spacecraft are commonly either very difficult or impossible to replace. The problem is heightened by the increased power requirements of many satellites an space stations. The trend of past power requirements for spacecraft has been steady growth, and this trend is expected to continue for the larger and more powerful spacecraft now being developed. Thus, there is a need for a more effective energy storage system that will satisfy the projected power requirements of future spacecraft.

The electrodes are particular components of battery cells that limit the energy density of batteries. The voltage performance of a battery cell electrode is limited by the amount of contact area between the active material and the electrode substrate or plaque, because voltage performance is affected by the current density across this interface. In particular, IR drop (resistance-induced voltage loss) and activation polarization (energy barrier controlled voltage loss) during charge/discharge cycling of the battery are difficult to reduce with present methods for constructing battery cell electrodes that limit the amount of active material contact area. Also, concentration polarization (diffusion limited voltage loss) of the positive electrode has diminished the performance of battery cell electrodes because of poor active material contact area.

Porous plaques have been used to improve the performance of batteries. The use of porous plaques greatly increases the contact area for the deposition of active material. However, the microsurface of the plaque tends to be very smooth, and therefore, surface area is not optimized. The smooth microsurface of plaques also makes it difficult to hold the active material in and on the plaque. Cell life is drastically reduced because the active material within the electrodes is often extruded from the pores of the plaque after continued operational cycling of the battery.

Various methods for making electrodes using porous plaques or substrates have been developed as disclosed in U.S. Pat. Nos. 3,335,033, 3,507,699, 3,523,828, 4,132,606, 4,292,143, 4,554,056 and 4,863,484. Porous "plaques" or "substrates" are electrically conductive structures that support an active material such as nickel hydroxide. Typically, they are flat thin pieces of porous nickel constructed by sintering pure nickel powder on a nickel screen. After the plaque has been formed, it often is electrochemically impregnated with active material by placing the plaque in a bath with an applied electrical potential. The methods disclosed in the above patents are directed to improving the performance of batteries with different processes for impregnating the plaque with active material. These methods use various baths and different voltage levels for impregnation. Nonetheless, a need for higher energy density than provided by electrodes constructed in accordance with the methods disclosed above continues to exist.

Some methods for increasing electrode voltage performance attempt to increase the amount of surface area on electrode substrates for active material contact by controlling the nickel powder morphology and sintering process. However, these methods have been unable to provide substantially more area on the plaque for impregnation without significantly weakening the mechanical strength of the plaque. A method is needed for increasing plaque surface area without significantly reducing plaque strength.

The present invention utilizes an electrochemical method for increasing the surface area (roughening) of the plaque. Other electrochemical processes causing surface roughening to a limited extent have been disclosed. In particular, Arvia, et al., disclose facetting platinum through an electrochemical process in *The Electrochemical Facetting of Metal Surfaces: Preferred Crystallographic Orientation and Roughening Effects in Electrocatalysis*. 20 Journal of Applied Electrochemistry 347-356 (May 1990); and *Review Article Electrochemical Facetting of Metal Electrodes*. 31 Electrochimica Acta 1359-1368 (Nov. 1986). It should be noted that electrochemical facetting is very different from surface roughening. Facetting or preferred crystallographic orientation of metal particles may be accomplished without any resulting surface roughening. Other articles related to electrochemical facetting also include: Perdriel, et al., *Different Processes Contributing to the Development of Preferred Oriented Platinum Surfaces by Fast Periodic Potential Perturbation Techniques*, 205 Journal of Electroanalytical and Interfacial Electrochemistry 279-290 (Jun. 25, 1986); Triaca, et al., *A Study of the Optimal Conditions for the Development of Preferred Oriented Platinum Surfaces by Means of Fast Square Wave Potential Perturbations*, 134 Journal of Electrochemical Society 1165-1172 (May 1987); Albano, et al., *A Mechanistic Model For the Electrochemical Facetting of Metals with Development of Preferred Crystallographic Orientations*, 33 Electrochimica Acta 271-277 (Feb. 1988); and Cervino, et al., *A Novel Effect. Changes in the Electrochemical Response of Polycrystalline Platinum Promoted by Very Fast Potential Perturbations*, 132 Journal of Electrochemical Society 266-67 (1985). In these publications, there is some indication that surface roughening which increases the contact area for active material, may result from the application of fast periodic potential perturbations (i.e., greater than 1000 Hz). However, roughening does not consistently result, and there is no suggestion or disclosure that such methods are applicable to the construction of battery cell electrodes. Moreover, there is no suggestion that facetting or roughening may be performed on porous plaques or substrates. In particular, Arvia's work is limited to planar electrodes and the applicability of facetting techniques to porous sintered nickel plaques is not considered in any of the papers. Also, nickel, a primary metal in the construction of battery electrodes, is omitted from the processes disclosed by Arvia, et al. in the above articles with the exception of the article entitled "*The Electrochemical Facetting of Metal Surfaces: Preferred Crystallographic*

*Orientation and Roughening Effects in Electrocatalysis."* However, this paper was published in May 1990, after the date of conception and reduction to practice of the present invention by the Applicants. The present invention is also distinguishable from the above papers which recommend fast potential perturbations because the present invention uses perturbations below 1000 Hz. Also, the techniques disclosed in the articles do not reveal fluctuating the voltage between the voltages for electrodissolution and electrodeposition of the plaque, but rely on electroadsorption and electrodesorption. The technique disclosed by Arvia is further distinguishable from the present invention because Arvia's work is absent any suggestion that the temperature of the solution can affect roughening. In fact, there is no suggestion or disclosure of elevating the temperature of the solution.

SUMMARY OF THE INVENTION

The present invention advantageously overcomes these problems by providing a new method for making a battery cell electrode that includes electrochemically roughening the surface of a plaque or substrate (10). The preferred embodiment of the method of the present invention comprises a step of providing a electrolytic solution (12). Then, electrical potential perturbations, that vary between an upper voltage at which electrodissolution of the plaque (10) occurs and a lower voltage at which electrodeposition on the plaque (10) occurs, are applied to the solution (12). The plaque (10) is then immersed in the solution (12) for a predetermined amount of time, which roughens the surface of the plaque (10) by the electrochemical reaction between the solution (12) and the plaque (10).

BRIEF DESCRIPTION OF THE DRAWINGS

FIG. 1A is a magnified perspective view of a portion of a porous sintered nickel plaque 10 before roughening by the method of the present invention;

FIG. 1B is a magnified perspective view of a portion of a plaque 14 roughened by the method of the present invention;

FIG. 2 illustrates a graph of the electrical potential perturbations applied to the solution 12;

FIG. 3 is a schematic diagram of a solution 12 and a voltage source 16 coupled in an electrode configuration that includes a reference electrode; and FIG. 4 is a schematic diagram of the solution 12 and a voltage source 16 coupled in an electrode configuration without a reference electrode.

DESCRIPTION OF THE PREFERRED EMBODIMENTS

The present invention advantageously provides a method for making an electrode 14 for battery cells with improved performance. As discussed briefly above, battery cell electrodes are commonly constructed utilizing substrates or porous plaques. These plaques are formed by joining particles of pure metal together in a high temperature sintering process. Typically, the plaques have a thin flat shape and are very porous. Their porous structure provides a large surface area for the impregnation of active material. The impregnation of active material is often accomplished by placing the plaque in a solution and either chemically or electrochemically depositing active material in the pores of the plaque. The entire surface area provided by the porous plaque may be covered with active material to form battery cell electrodes known in the art. However, impregnation could be accomplished in other ways, including chemical vapor deposition. Occasionally, the prior art methods perform a passivation treatment before the plaque is impregnated with active material. The passivation treatment typically involves oxidizing the surface of the sintered plaque merely to protect the structure from deterioration during the impregnation step, and provides little or no roughening of the surface of the sintered plaque.

While the battery cell electrodes will be discussed here with reference primarily to porous sintered nickel plaques, it should be understood to one of ordinary skill in the art that the method of the present invention is applicable to a variety of other electrode manufacturing methods, including those that use planar substrates and other metallic substrates to form electrodes for battery cells. For example, the method of the present invention may be used in the production of cadium electrodes which are negative electrodes that typically use porous sintered nickel plaques and cadmium hydroxide active material, or in the production of iron electrodes which are positive electrodes that use porous sintered iron plaques and iron hydroxide active material.

The present invention advantageously comprises a method for roughening the surface of a substrate or plaque 10, which is a precursor to the electrode, to significantly increase the amount of contact area for active material provided by the plaque 10 and thus, improve the performance of the finished electrode and ultimately the battery cell. The present invention increases the amount of surface area on the plaque or substrate 10 by roughening the surface of the substrate 10 after it has been formed, but before impregnation of active material. This roughening is also very different from any passivation treatment. This intermediate roughening step advantageously improves the performance of a battery cell formed with an electrode made in accordance with the present invention by reducing the various voltage losses including IR drop (resistance-induced voltage loss) and activation polarization (energy barrier controlled voltage loss) during charge-discharge cycling of the battery, and possibly reducing concentration polarization (diffusion limited voltage loss) in the positive electrodes. The roughening provided by the method of the present invention also improves the battery cell's cycle life by locking the active material in place and preventing the extrusion of active material from the pores of the plaque 10. Moreover, the method of the present invention can achieve the roughening of the plaque 10 without weakening the structural characteristics of the electrode, and without increasing the mass of the sintered plaque. If desired, the method of the present invention can provide increased surface area with a concomitant increase or decrease in mass and possibly mechanical strength.

The preferred embodiment of the present invention utilizes a sintered plaque 10 of nickel, a portion of which is FIG. 1A. In an exemplary embodiment, the sintered plaque 10 has a 3.5 inch diameter, a 30 mil nominal thickness and a porosity of about 80-84%. Since the plaque 10 is nickel, it should be understood that the solution, voltages, temperature, and time to which the plaque 10 is subjected are determined in part by the material that composes the plaque 10. However, the method of the present invention may be used to roughen plaques made of other metals such as iron or cadmium, or possibly metallic alloys. The plaque structure has been used to form electrodes because its porosity provides a large amount of surface area for the impregnation of active material. However, the microsurface of such sintered plaques is typically very smooth. Therefore, the method of the present invention advantageously increases the surface area of the plaque 10 to prepare it for the impregnation of more active material by using an electrochemical process that roughens the microsurface of the plaque 10 by dissolving small particles of the plaque 10 (atoms convert to ions) into a electrolytic solution 12 and then redepositing the particles (ions convert to atoms) in the solution 12 back onto the surface of the plaque 10. The present method for roughening the surface of the battery plaque 10 preferably comprises the steps of: providing the electrolytic solution or bath 12; heating the solution 12 to a temperature elevated above ambient temperature; removing all gases from the plaque 10; placing the plaque 10 in the solution 12; and applying electrical potential (voltage) perturbations to the plaque 10 in solution 12 for a predetermined amount of time; and rinsing the plaque 10 to remove any remaining solution 12 from the plaque 10.

A first step in the method of the present invention is providing the surface roughening bath or solution 12 suitable for both electrodissolution and electrodeposition of the plaque 10. The electrolytic solution 12 is preferably an acid that has a pH in the range of about 2 to 5. The solution 12 preferably includes the dissolved material or metal that composes the plaque 10. This advantageously prevents any weight gain or loss, and thus, prevents deterioration of the structure due to dissolution of the plaque 10 in the solution 12 and preserves mechanical strength. The solution 12 also excludes any substances that promote the formation of active material on the surface of the plaque 10. The method of the present invention provides only roughening and no impregnation. In an exemplary embodiment, the solution 12 is a nickel-plating (Watts) bath comprising nickel sulfate ($NiSO_4$), nickel chloride ($NiCl_2 \cdot 6H_2O$) and boric acid ($H_3BO_3$). The solution 12 preferably has about 225–375 g/L of nickel sulfate, 30–60 g/L of nickel chloride and 30–40 g/L of boric acid. It is apparent that the solution 12 contains the metal that forms the plaque 10, namely nickel, to prevent any loss or gain in the weight of the plaque 10, thereby preventing weakening of the plaque 10.

Once the solution 12 has been prepared, it is heated to a temperature elevated above ambient. The temperature of the solution 12 is advantageously elevated to increase the reaction rate of electrodissolution and electrodeposition, and thereby reduce the amount of time required to roughen the surface of the porous plaque 10. Also, elevated temperatures have been found to increase the uniformity of the roughened plaque surfaces throughout its thickness. A temperature in the range between about 40 and 70 degrees centigrade is preferred. In an exemplary embodiment, the solution 12 is heated to a temperature of about 60 degrees centigrade. It should be noted that this step may be performed even after the plaque 10 has been placed in the solution 12, although it is preferable to heat the solution 12 before the voltage potential is applied.

In addition to heating the solution 12 to an elevated temperature, the plaque 10 is placed in the solution 12. However, to assure that the solution 12 contacts most of the surface area of the plaque 10 including areas inside the pores of the plaque 10, all the gases (which might include air) in and around the plaque 10 are removed. The gases are removed by placing the plaque 10 in a vacuum. After the gases in and about the plaque 10 have been removed and the plaque 10 remains in the vacuum, the solution 12 is applied to the plaque 10 preferably by immersion, thereby allowing all microsurfaces in and on the plaque 10 to make contact with the solution 12. The plaque 10 remains in the solution 12 for a predetermined amount of time, but the vacuum may be removed while the plaque 10 is subjected to the potential perturbations in the solution 12 at a controlled temperature so long as the plaque 10 remains immersed. For the exemplary embodiment, a time of about 0.5 to 5.0 hours was found to be sufficient to cause the plaque 10 to be roughened. The content of the solution 12, the potential applied to the solution 12, the frequency of the potential applied, and the temperature of the solution 12, all determine the amount of time required to roughen the surface of the plaque 10. Thus, the predetermined time may vary if any one of the above parameters is modified.

After the plaque 10 has been placed in the solution 12, the electrical potential perturbations are applied to the plaque 10. The potential of a voltage source 16 applied to the solution 12 preferably fluctuates between an upper voltage at which electrodissolution of the plaque 10 into the solution 12 occurs and a lower voltage at which electrodeposition of nickel ions in the solution 12 onto the plaque 10 occurs. The potential perturbations preferably have the waveform as illustrated in FIG. 2. The perturbations in the applied potential cause the nickel that composes the sintered plaque 10 to be dissolved into the solution 12 and nickel in the solution 12 to be redeposited onto the surfaces of the plaque 10, thereby causing the smooth microsurface to be roughened. The frequency of the potential can be in the range of $10^{-3}$ Hz to 1000 Hz. The potential is preferably periodic, operating at relatively low frequencies, i.e., below about 100 hertz. In an exemplary embodiment, a repetitive triangular potential waveform of 1.6 volts peak to peak (from about $-1.2$ volts to 0.4 volts) versus a saturated calomel reference electrode with a frequency of 25 hertz was used. While a triangular waveform was used, the method of the present invention is relatively independent of the waveform used, so long as it is repetitive.

Referring now to FIG. 3, the application of the voltage perturbations to the solution 12 is described. As shown in FIG. 3, an electrode configuration including a reference electrode 18, the plaque 10, and a pair of auxiliary electrodes 22 is preferred. In such a system, the potential perturbations are applied to the plaque 10 by coupling the voltage source 16 to the plaque 10 and the two auxiliary electrodes 22, and then immersing the plaque 10 and the electrodes 22 in the solution 12. The method of the present invention preferably uses the plaque 10 as a working electrode. The plaque 10 is coupled to the voltage source 16, for example a potentiostat, by a lead 24 and immersed in the solution 12. In an exemplary embodiment, the auxiliary electrodes 22 are made of two nickel 200 plates. The auxiliary electrodes 22 are coupled together and to another lead 26 of the voltage source 16. The auxiliary electrodes 22 are then immersed in the solution 12 to assure full electrical contact between the electrodes 22 and the solution 12. Each auxiliary electrode 22 is preferably positioned parallel to the other auxiliary electrode 22 and about an inch away from the plaque 10. Additionally, the reference electrode 18 such as a saturated calomel electrode is provided to measure the voltage of the plaque 10, and control the current between the plaque 10 and the auxiliary electrodes 22 via a feedback loop within the voltage source 16. The reference electrode 18 is coupled to the voltage source 16 by a lead 25. The reference electrode 18 is preferably positioned in the solution 12 at about the same distance from the plaque and auxiliary electrodes 10, 22. The reference electrode 18 is positioned so that the current path between the plaque 10 and the auxiliary electrode 22 is unobstructed, and electrodissolution and electrodeposition of the plaque 10 remains unaffected.

While the electrode configuration described above is preferred, it should be understood that other electrode configurations that employ the plaque 10 and one auxiliary electrode 22 as well as any number of additional reference and auxiliary electrodes 18, 22 may be used to apply potential perturbations to the solution 12. Minimally, any configuration that comprises a least the plaque 10 and an auxiliary electrode 22, as shown in FIG. 4, would be sufficient for applying potential perturbations. The electrode configuration of FIG. 4 couples the plaque 10 and auxiliary electrode 22 to the voltage source 16 with the leads 24, 26 in a manner similar to the configuration described above that included a reference electrode. However, in this electrode configuration, no reference electrode is needed, and the electrodissolution and electrodeposition voltages are measured between the plaque 10 and auxiliary electrodes 22 instead of the plaque 10 and reference electrode 18. The voltages for this electrode system would be different relative to the reference electrode system described above.

After the appropriate period of time, the plaque 10 is transformed into roughened plaque 14, a portion of which is illustrated in FIG. 1B. The roughened plaque 14 is then taken out of the solution 12 and any solution 12 remaining in and on the roughened plaque 14 is removed. The solution 12 can be removed by rinsing the roughened plaque 14 with warm distilled water for several hours. For example, the roughened plaque 14 may be placed in a warm, deionized water soak overnight. After the remaining traces of solution 12 have been removed, the roughened plaque 14 may be impregnated by depositing active material on the surface and in the pores of the roughened plaque 14. Impregnation may be accomplished by any one of the many methods known in the art. Additionally, prior to the impregnation of active material, the roughened plaque 14 may undergo any of the various passivation treatments known in the art.

Having described the invention in connection with certain preferred embodiments thereof, it will be understood that many modifications and variations thereto are possible, all of which fall within the true spirit and scope of this invention. More particularly, it should be understood to one skilled in the art that the morphology of the roughening is determined by the parameters of frequency, amplitude, bias, time, pH, temperature and composition of the solution 12. These processing parameters may also be adjusted for substrates with different structures and substances other than nickel. Additionally, a change in the composition of the solution 12 may require adjustment of the temperature, frequency and voltage to achieve roughening within the predetermined time.

What is claimed is:

1. A method of making a battery cell electrode having a substrate, said method comprising the steps of:

roughening a surface of the substrate, prior to impregnating the substrate with active material, by immersing the substrate in a solution having electrical potential perturbations applied thereto; and removing any remaining solution from the substrate; and wherein the electrical potential perturbations vary between an upper voltage at which electrodissolution of the substrate occurs and a lower voltage at which electrodeposition on the substrate occurs.

2. The method of claim 1, wherein the solution is suitable for electrodissolution and electrodeposition of the substrate.

3. The method of claim 1, wherein the solution is acidic.

4. The method of claim 1, wherein the solution comprises ions of the same element as the substrate.

5. The method of claim 1, wherein the solution is elevated to a temperature above ambient.

6. The method of claim 1, wherein the electrical potential perturbations are periodic and have a frequency in the range of about $10^{-3}$ Hz to about 1000 Hz.

7. The method of claim 1, wherein the substrate is porous.

8. The method of claim 1, wherein the substrate comprises nickel.

9. A method for roughening the surface of a battery cell electrode, said method comprising the steps of:

providing an electrolytic solution;

placing the electrode in the solution; and applying electrical potential perturbations to the electrode for a predetermined amount of time to roughen the surface of the electrode by dissolving particles of the electrode in the solution and then redepositing the particles on the electrode, said potential perturbations cycling between an upper voltage at which electrodissolution of the electrode occurs and a lower voltage at which electrodeposition on the electrode occurs, said potential perturbations having a frequency in the range of about $10^{-3}$ Hz to about 1000 hertz.

10. The method of claim 9, wherein the solution is capable of electrodissolution and electrodeposition of the electrode.

11. The method of claim 9, wherein the solution is acidic.

12. The method of claim 9, wherein the solution comprises ions of the same element as the electrode.

13. The method of claim 9, wherein the solution has a temperature elevated above ambient.

14. The method of claim 9, wherein the electrode is porous.

15. A roughened plaque for a battery cell formed by the method of claim 9.

16. A method for roughening the surface of a plaque, said method comprising the steps of:

providing an electrolytic solution;

placing the plaque in the solution;

heating the solution to a temperature elevated above ambient;

applying electrical potential perturbations to the solution for a predetermined amount of time for roughening the surface of the plaque by dissolving particles of the plaque in the solution and then redepositing the particles on the electrode; and removing any remaining solution from the plaque.

17. The method of claim 16, further comprising the step of removing gases from the plaque by placing the plaque and the solution in a vacuum.

18. The method of claim 16, wherein the solution comprises ions of the same element as the plaque.

19. The method of claim 16, wherein the plaque comprises nickel and the solution comprises nickel sulfate, nickel chloride and boric acid.

20. The method of claim 16, wherein the solution is capable of electrodissolution and electrodeposition of the plaque and contain no substances that will cause the formation of active material.

21. The method of claim 16, wherein the solution is acidic.

22. The method of claim 16, wherein the elevated temperature is within the approximate range of 40 degrees C. to 70 degrees C.

23. The method of claim 16, wherein the potential perturbations have a frequency in the range of about $10^{-3}$ to 1000 hertz.

24. The method of claim 16, wherein the potential perturbations have a frequency of about 25 hertz.

25. The method of claim 16, wherein the step of applying potential perturbations comprises the substeps of:
    inserting a first auxiliary electrode into the solution;
    inserting the plaque into the solution; and
    coupling a voltage source to the solution through the first auxiliary electrode and the plaque, said voltage source producing periodic potential perturbations.

26. The method of claim 25, wherein the step of applying potential perturbations further comprises the step of inserting a second auxiliary electrode into the solution and coupling said second auxiliary electrode to the first auxiliary electrode.

27. The method of claim 26, wherein the step of applying potential perturbations further comprises the step of inserting a reference electrode in the solution and coupling said reference electrode to the voltage source for controlling the current between the plaque and the first and second auxiliary electrodes.

28. The method of claim 27, wherein the voltage source applies a voltage of about 1.6 volts peak to peak between the reference electrode and the plaque.

29. The method of claim 16, wherein the predetermined amount of time is between about 0.5 to 5.0 hours.

30. The method of claim 16, wherein the step of removing any remaining solution from the plaque comprises rinsing the plaque with water.

31. The method of claim 16, wherein the plaque is porous.

32. A method for roughening the surface of a porous plaque, said method comprising the steps of:
    removing gases from the plaque by placing the plaque in a vacuum;
    providing a solution comprising nickel sulfate, nickel chloride and boric acid;
    heating the solution to an elevated temperature of about 60 degrees centigrade;
    placing the plaque in the solution for about 0.5 to 5.0 hours;
    applying to the plaque periodic electrical potential perturbations having a range of approximately $-1.2$ volts to 0.4 volts between the plaque and a reference electrode, and said potential perturbations having a frequency of approximately 25 hertz; and
    removing any remaining solution from the plaque by rinsing the plaque for several hours.

* * * * *